United States Patent
Engström et al.

(10) Patent No.: US 7,088,378 B1
(45) Date of Patent: Aug. 8, 2006

(54) SYSTEM AND METHOD FOR PROVIDING INFORMATION REGARDING MOUNTING, DISMOUNTING AND SERVICING A BEARING OR A SEAL

(75) Inventors: Bengt Engström, Mölnycke (SE); Leif Lewinschal, Angered (SE); Magnus Rydin, Amsterdam (NL)

(73) Assignee: Aktiebolaget SKF, Gothenburg (SE)

( * ) Notice: Subject to any disclaimer, the term of this patent is extended or adjusted under 35 U.S.C. 154(b) by 957 days.

(21) Appl. No.: 09/718,385

(22) Filed: Nov. 24, 2000

(51) Int. Cl.
*G06F 6/00* (2006.01)

(52) U.S. Cl. ........................... 345/715; 345/705
(58) Field of Classification Search ................ 345/705, 345/712, 714, 715; 705/25, 26
See application file for complete search history.

(56) References Cited

U.S. PATENT DOCUMENTS

| | | | |
|---|---|---|---|
| 4,899,292 A | * | 2/1990 | Montagna et al. ....... 707/104.1 |
| 5,535,422 A | * | 7/1996 | Chiang et al. .............. 345/709 |
| 5,771,043 A | * | 6/1998 | Nigawara et al. .......... 345/419 |
| 5,839,112 A | * | 11/1998 | Schreitmueller et al. ....... 705/4 |
| 5,856,931 A | | 1/1999 | McCasland |
| 5,913,033 A | * | 6/1999 | Grout ......................... 709/219 |
| 5,950,173 A | * | 9/1999 | Perkowski ................... 705/26 |
| 6,070,149 A | * | 5/2000 | Tavor et al. .................. 705/26 |
| 6,289,370 B1 | * | 9/2001 | Panarello et al. ........... 709/200 |
| 6,505,243 B1 | * | 1/2003 | Lortz .......................... 709/220 |
| 6,507,352 B1 | * | 1/2003 | Cohen et al. ................ 345/817 |

FOREIGN PATENT DOCUMENTS

WO 9819259 5/1998

OTHER PUBLICATIONS

Hearth Technologies Inc. Fireplace, Nov. 22, 1999, Hearth Technologies Inc. pp. 1–13.*
Koyo Corporation of USA, Mounting and Handling instructions—Pillow Block Bearings, Sep. 1999, Koyo Corporation of USA, pp. 1–8.*
Julie Schnelker,"2400/ E Cat.PM65", Handling of a Bearing Unit, Oct. 19, 1998, NTN Bearing Corporation, http://www.ntnamerica.com/Engineering/PDFs/2400/hdlngbrg-.pdf, pp. 35–42.*
Koyo Mounting and Handling Instruction Sep. 1999.*

* cited by examiner

Primary Examiner—Cao (Kevin) Nguyen
(74) Attorney, Agent, or Firm—Burns Doane Swecker & Mathis LLP (57) ABSTRACT

A support information communication system for transferring requests for information support that is to be used by personnel performing servicing, mounting and/or dismounting of a bearing and/or a seal. The system includes one or more information terminals and an information support computer.

37 Claims, 6 Drawing Sheets

SYSTEM AND METHOD FOR PROVIDING INFORMATION REGARDING MOUNTING, DISMOUNTING AND SERVICING A BEARING OR A SEAL

FIELD OF THE INVENTION

The present invention generally relates to an information support system which can be used by, for example, support personnel performing servicing, mounting and/or dismounting of a bearing or a seal. More particularly the information support system comprises an information support computer for providing support information, an information terminal for obtaining support information, a support information communication system for transferring requests for and information support, a computer program product, and methods for providing and obtaining information support.

BACKGROUND OF THE INVENTION

The knowledge associated with products and procedures related to these products, e.g., the knowledge necessary for properly handling the products, has increased during the last decade in a variety of technical fields. One of these fields involves bearings and seals. Even though the basic principles of today's bearings and seals are, in some cases, almost 100 years old, the procedures associated with mounting, dismounting and servicing them has steadily grown, and continues to grow, in complexity and importance. An improperly mounted bearing or seal, for example, can significantly reduce the life of the bearing or seal. There is thus great value in properly mounting, dismounting and servicing a bearing or a seal.

The proper mounting, dismounting and servicing of bearings and seals involves many different factors Typically, seal or bearing manufacturers will publish a manual or other similar technical handbook describing the various products produced by the company and setting forth various instructional information, including instructional information regarding mounting, dismounting and servicing the products. A customer needing to mount, dismount or service a bearing or seal, can then consult the manual or handbook to obtain the necessary information about mounting, dismounting or servicing the bearing or seal.

One difficulty associated with this procedure is that a customer seeking information about mounting, dismounting or servicing a particular bearing or seal must search through the many different products referenced in the manual or handbook to identify the product of particular relevance. This may be a rather time consuming and cumbersome task. In addition, this procedure presents the possibility that the incorrect product may be identified, thus possibly resulting in an incorrect mounting, dismounting or servicing procedure being carried out.

The progress in the fields of computers and communications have reached a point where they now can offer increased competitive advantages for companies in a wide variety of technological fields, including even relatively more mature technical fields such as bearings and seals. The inventors herein have thus discovered that advantages can be obtained by using these advancements in technology in areas such as bearings and seals.

In WO 98/19259 a system and method for managing and serving consumer product related information over the internet is presented. This document describes a system and method for finding and serving information pertaining to a particular product on the internet. It also includes an aspect of an inter-based consumer product information delivery system. A chief purpose of this system and method is to disseminate consumer product information in order to advertise and sell products. Another purpose seems to involve providing assistance to consumers searching for specific products by using stored Universal Product Numbers (e.g. UPCs) which are preassigned to each consumer product registered in the system. To obtain more information of a specific consumer product there are Uniform Resource Locators (URLs) available that point at other information sources available at other servers outside the system. Another purpose of the disclosed system and method is to link a potential user of a consumer product to a provider of that consumer product provided that provider is registered in the system.

U.S. Pat. No. 5,856,931 describes a method and system for identifying, organizing, scheduling, executing, analyzing and documenting detailed inspection activities for specific items or assets in either a time-based or on-demand fashion. The method and system described in this document can be used in relation to, for instance, machinery of a factory plant. It can be used as an assistant assisting personnel to perform inspections correctly by instructing what features to inspect. For instance, the disclosed system and method can be used to assist and supervise personnel performing lubrication procedures of one or more machines. The system determines the points that receive specific attention based on multiple selection criteria both calculated by the method and input by the user.

SUMMARY OF THE INVENTION

One aspect of the present invention involves an information support system in which the information is related to the activities of mounting, dismounting and servicing a bearing or a seal. The support information is intended to be used by people performing one of the activities of mounting, dismounting and servicing a bearing or a seal.

Using detailed information such as that mentioned above results in an increased ease of understanding resulting so that people or personnel are likely to perform the activities with a higher degree of quality. The information can also reduce the risk of unexpectedly long times for performing activities based on the uncertainty of the information needed to perform an activity. This may be especially important in manufacturing plants. The present invention also presents favorable opportunities to update the information within the information support system relatively quickly and easily.

Another aspect of the invention involves an information support computer which offers the opportunity of distributing unique mounting, dismounting or servicing information for a specific bearing or a seal.

The present invention also provides an information terminal for obtaining support information for personnel involved with servicing, mounting and/or dismounting a bearing and/or a seal.

In addition, the present invention provides a computer program product loadable into the internal memory of a computer, comprising software code portions for performing various steps when run on a computer.

The present invention envisions at least two alternative ways of communicating support information.

According to one approach, the support information is arranged to be provided in a single information support transmission in response to a request comprising a set of data relating to the information. In order to accomplish this, the person using an information terminal inputs characteristics of the activity to be performed. The characteristics can be seen as the set of data relating to the information that is requested. Thereafter, the information support computer provides a set of support information items that is congruent with the characteristics and the set of data relating to the information that is requested. Thereafter, the set of support information items is transmitted to the information terminal. That is, there are only two transmissions in the system between the information terminal and information support computer. The first one from an information terminal to the information support computer and the second one from the information support computer to the information terminal. In the second transmission all support information needed to perform a specific activity of the ones specified above is included.

According to a another approach, the support information is arranged to be provided sequentially and transmitted in several information support transmissions intending to support personnel performing one of the activities as the process proceed. A difference between this second approach and the first approach presented above is that the second approach normally includes a higher number of transmissions since it also within the scope of the present invention to transmit support information in portions supporting only a sub process of one of the activities instead of obtaining a whole set of support information supporting the whole process. Thus the second approach results in more requests for information support since the response of each request is less extensive. This approach is promising when using the present invention in the context of portable communication devices in parallel to the development of the process of one of the activities.

The two approaches described above represent examples and several other alternatives exist for transferring a request from an information terminal and communicating information support from the information support computer.

Because the information support computer is intended to transmit support information via a communication network, such as the internet, the format of the transmitted information support is preferably arranged to be hypertext mark-up language (HTML). Using an already existing communication network, such as the internet, saves resources in relation to building or configuring a separate communication network.

The support information can be arranged to comprise three categories of information, including a precautions category, an activity procedures category and a recommended tools category. The precautions category is important because not acknowledging precautions that need to be taken to perform the activity (e.g., mounting, dismounting and/or servicing a bearing and/or seal) can result in poor efficiency in carrying our or performing the activity.

The activity procedures category is important because the support information, regardless of which one of the two mentioned above is used, includes detailed information concerning the individual steps of the activity procedures, e.g., mounting, dismounting and/or servicing a bearing and/or seal. Poor or incorrect handling of tools and parts can have negative effects on the activity to be performed. This makes it possible to perform an activity without having to bring relevant information from a number of sources, such as handbooks and catalogues, to the location at which the activity is intended to be performed. Also, performing the activity at this location is easier because it is not necessary to retrieve information from a variety of information sources. Also the risk of prolonging the time needed for an activity is reduced by using the information support system according to the present invention. Of course, a reliable indication of the time needed to perform an activity is often relevant.

The recommended tools category is relevant because properly performing an activity, such as mounting, dismounting and/or servicing a bearing and/or seal, is to an extent based on having accurate information regarding the tools that should be used to perform the activity. It is possible, within the context of the present invention, to offer users of the information support system the ability to purchase recommended tools for performing the desired activity. The system can also be arranged to offer a link to an e-commerce web page offering to purchase the tools.

In one embodiment, the transmitted support information is arranged to present opportunities for requesting further information support. An effect of this is that a more user friendly system is provided and the system will be applicable to modem information technology, including the internet.

In another embodiment, the information support system is arranged to allow a user to choose one of several alternatives of the activities. This is motivated by the varieties of ways of, for instance, mounting a bearing. Increasing one's ability to obtain information in this respect leads to faster and better performance of an activity.

In another embodiment the information support computer is arranged to receive a code from an information terminal. The code causes the information support computer to provide and transmit support information relevant to an activity specifically related to the code. That is, by simply inputting a code on an information terminal connected to a support information computer, which code for instance is available on the box or other packaging of a product that is to be mounted, it is possible to obtain support information in a relatively fast, easy and efficient manner. In addition, it is possible to obtain support information that is relevant for the specific activities related to the code. This feature specifically applies to mounting a bearing or a seal.

According to another aspect of the invention, the information support system is arranged to allow users to choose a language of the support information from a predetermined set of languages comprised in the information support computer. This of course leads to increased opportunities of opening up the use of the present invention to a wide variety of users.

The information support can be in the form of text and images for increasing the opportunity of providing information support that is detailed and easy to understand. This leads to support information that can reduce the risk of prolonged activities.

The information terminal can be constituted by a stationary computer, a portable computer, a hand-held computer, and/or a mobile phone. The present invention is related to the internet and the mobile internet. Special hardware arrangements for communicating with the information support computer are not needed and this facilitates connection to the information support computer via the communication network.

The information support system can be arranged with printing capabilities for printing the support information received by an information terminal. Normally, the information terminals and the information support computer are remotely arranged in relation to each other. This leads to increased opportunities of distributing the support information in digital form. However, the information terminals and the information support computer do not necessarily have to be remotely arranged. In case there are difficulties in obtaining the information due to limited information technology infrastructure at the place of the activity, it is possible for the provider of the information support system to assist in providing print-outs of the information support.

In accordance with another aspect of the invention, a graphical user interface for selecting information, such as service information, associated with a bearing and/or a seal, includes a first interface element for entering a code associated with the bearing and/or seal, and a second interface element for selecting one of a plurality of types of procedures for which the information is to be provided.

BRIEF DESCRIPTION OF THE DRAWING FIGURES

The foregoing and additional features and characteristics of the present invention will become more apparent from the following detailed description considered with reference to the accompanying drawing figures in which.

DETAILED DESCRIPTION OF THE INVENTION

The following description describes the present invention in the context of handling information support as it relates to one type of activity relating to bearings and/or seals, namely support information involving the mounting of a specific bearing. However, it is to be recognized that the present invention is also applicable to providing support information for activities that include servicing and dismounting the bearing. The information support can also be used in the context of mounting, dismounting and servicing seals, and is applicable to an entire range of bearings and seals sold by a particular company.

Figure 1:
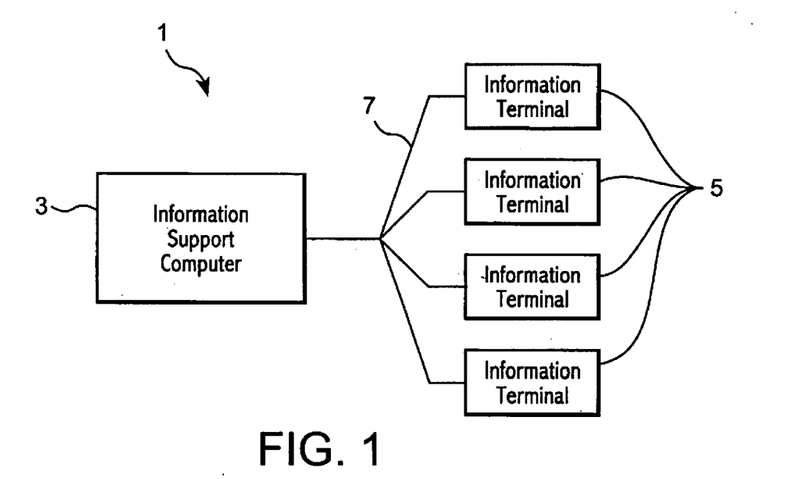
FIG. 1 schematically depicts an information support system comprising an information support computer and an information terminal.

Referring initially to FIG. 1, an information support system or support information communication system 1 is provided for transferring requests for information support that is to be used by personnel performing the desired or necessary activity, for example mounting a bearing. The information support system or support information communication system is mainly comprised of two components, an information support computer 3 and an information terminal 5. These two components are connected to each other via a communication network 7. Via the communication network 7, a request for support information is communicated to the information support computer 3 from the information terminal 5. In response to a request for support information, the information support computer 3 is arranged to transmit support information to the information terminal 5. The information support computer 3 is arranged to transmit the information support in the form of text and images.

In this embodiment, the internet constitutes the communication network 7. Also, as illustrated in FIG. 1, one or more of information terminals 5, and possibly also one or more information support computer 3, are remotely arranged in relation to each other. Thus the geographical distance between the information terminals 5 and the information support computer 3 can be quite extensive (e.g., worldwide).

Figure 2:
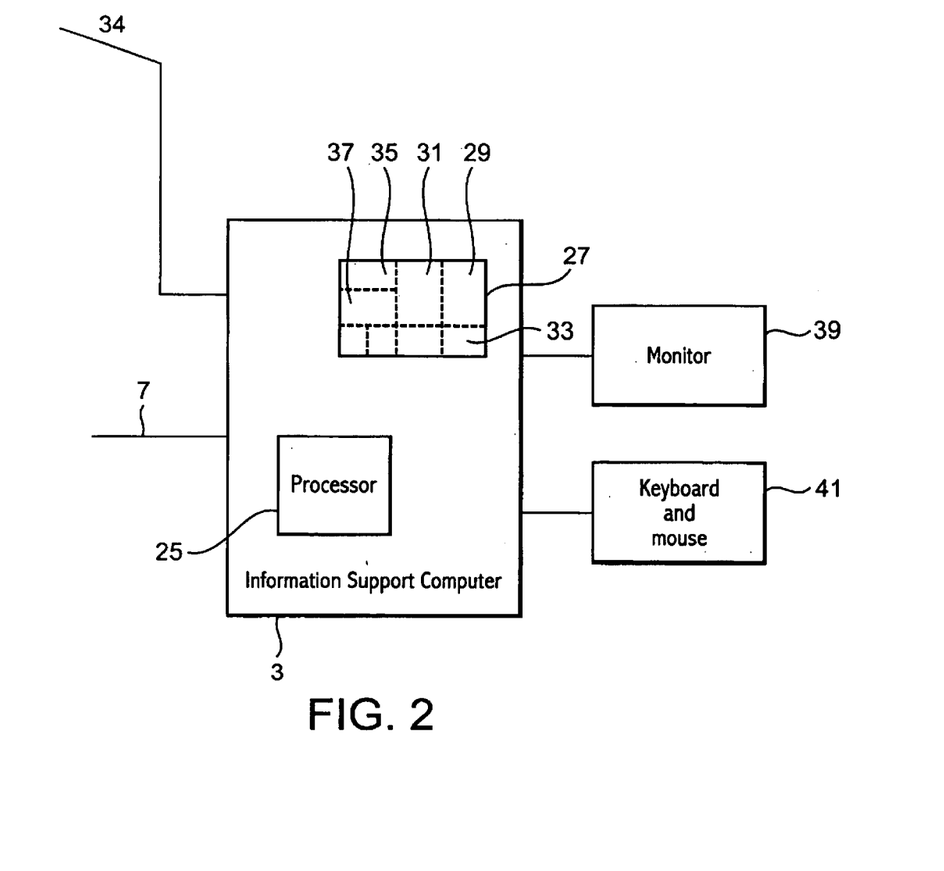
FIG. 2 schematically depicts an information support computer.

FIG. 2 illustrates more details associated with the information support computer 3 for providing support information relating to the desired or necessary activity, which in this case involves mounting a bearing. The information support computer 3 is connected to the communication network 7 (e.g., the internet). The information support computer 3 shown in FIG. 2 comprises a processor 25 which is arranged to process requests from the information terminal(s) 5. The information support computer 3 is responsive to and receives information support requests via the internet communication network 7 from the information terminal(s) 5. The processor 25 is arranged to process the information support request by providing support information. This is achieved by using information in a support information database 27. The information that is used or conveyed is related to the nature of the request. After retrieving the information support from the collection of support information in the database 27, the processor 25 transmits the support information via the communication network 7 to the information terminal(s) 5.

In this embodiment the information support computer 3 is arranged to provide the support information in a single information support transmission in response to a request comprising a set of data relating to the one information. That is, the user(s) of the information terminal(s) 5 inputs a series of requests concerning the activity to be performed (e.g., mounting a bearing). These requests are transmitted to the information support computer 3 either in a plurality of sub requests, which together can constitute or be seen as a request, or individually to the information support computer 3 to be processed together. Regardless of how an information support request is transmitted to the information support computer 3, the response, i.e. the support information to be transmitted to the information terminal 5, is transmitted in one or more transmissions.

An alternative is to arrange the information support computer 3 to respond after each sub request, resulting in a plurality of information support transmissions to the information terminal 5. Here the transmitted support information is preferably arranged to present opportunities for requesting further information support.

According to a preferred embodiment, the processor 25 of the information support computer 3 is arranged to provide the information support in the format of hypertext mark-up language (HTML).

The support information database 27 comprises information in at least three categories of information, namely information related to precautions, information related to activity procedures and information related to recommended tools. Thus, the information database 27 can be outfitted with three sub databases. One such sub database, a precautions database 29, comprises information regarding the precautions that should be taken or that the personnel should be aware of when performing an activity (e.g., mounting a bearing), such as the need for a clean environment. Another of the sub databases, an activity procedures database 31, comprises information regarding the steps to be carried out when performing an activity procedure (e.g., mounting a bearing). The steps may be several and may be set forth in order to simplify the work related to the activity. The third sub database, a recommended tools 33 database, contains information relating to recommended tools to be used when performing a particular activity. The information support computer 3 can be arranged to offer personnel the opportunity to purchase the recommended tools. This can be achieved, for example, by offering a link 34 to a page on an internet server outside the realm of the information support system according to the present invention. Also, the information support system can preferably be arranged to offer information support with respect to various alternatives associated with the activities. This offers the advantage of letting the user choose, for instance, the method by which a bearing is mounted. Thus, the present invention provides a number of different databases or sub databases from which various types of support information can be derived, and according to a preferred embodiment a request for information support results in a combination of information from the three sub databases 29, 31, 33. The combination of information is assembled by the processor 25.

The support information database 27 can also be arranged to comprise a language database 35. The information support system can be adapted to allow users to choose the language of the support information from a predetermined set of languages. The language database 35 thus comprises translations of the support information in different languages.

A particularly useful attribute of the present invention involves the ability to input a code, such as a bar code, number, letter combination or other identifying indicia at the information terminal 5. The information support computer 3 includes a code database 37 in which is stored a collection of codes. Each code in the database is related to specific information in the three sub databases (i.e., the precautions database, the activity procedures database and the recommended tools database) of the support information database 27. When the information support computer 3 receives an information support request including a code, the processor 25 is arranged to provide information support from the three databases specifically related to a particular product (e.g., a particular model of a bearing or seal) or an activity associated with a particular product. This leads to an efficient use of the present invention. Thus, for example, a purchased product (e.g., a bearing or seal) would be provided with a code (e.g., on the box, packaging or other packaging materials associated with the product) which would be uniquely associated with the particular product as well as information support related to such product, including information in the three sub databases mentioned above. By entering the code at the information terminal 5, information support in the three sub databases of the support information database 27 associated with such product is sent by the processor 25 to the terminal 5, thus providing support information to the user about the product and activities related to the product, including precaution information, activity procedure information and recommended tool information. It is to be recognized that even though a code has been received and processed by the information support computer 3 there may still be a need for more information to be inputted by the user of the information terminal 5 before an information support transmission can be transmitted.

The information support computer 3 is provided with a presentation means 39, such as a monitor or display, for presenting data in relation to the information support system 1. Examples of the data to be presented on the presentation means 39 include the contents of the different databases and the transmissions to the information terminals 5. In order to be able to change the contents of the databases and to control the information support system 1, data and information inputting means 41, such as a keyboard and a mouse, are arranged at the information support computer 3. In this embodiment the information support computer 3 is constituted by a general purpose computer, such as a PC or a server.

Figure 3:
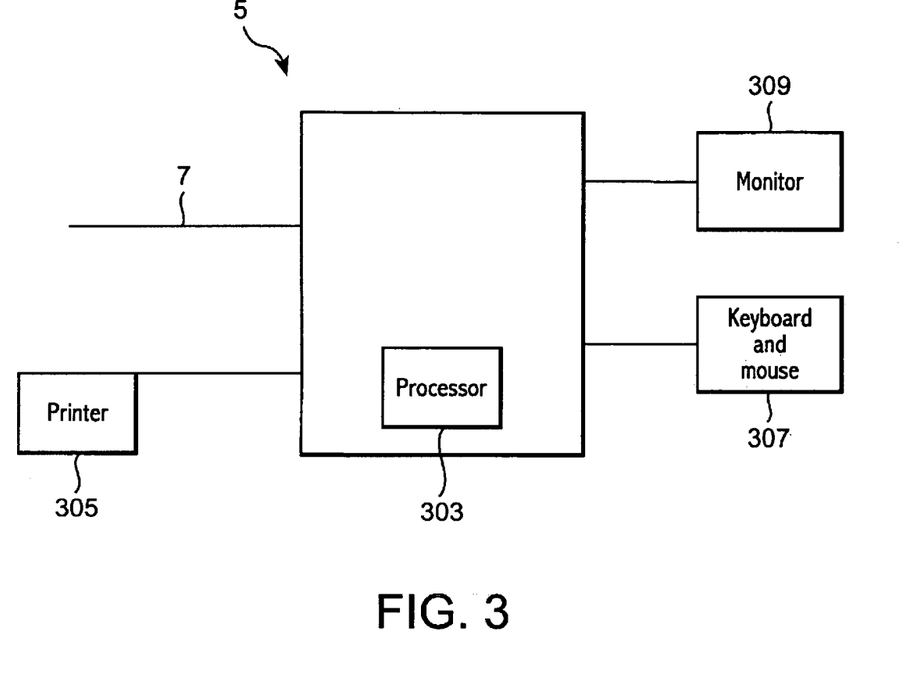
FIG. 3 schematically illustrates an information terminal.

FIG. 3 illustrates additional details associated with the information terminal 5 for obtaining support information for personnel performing at least one of the activities of servicing, mounting and dismounting a bearing and/or a seal. The information terminal 5 can be in the form of a stationary computer, a portable computer, a hand-held computer, or a mobile phone. The mobile phone is preferably arranged with mobile internet capabilities. The information terminal 5 comprises a processor 303 which is arranged to receive and present information support from the information support computer 3 via the communication network 7 after having transmitted an information support request as described above. When the information terminal 5 is in the form of a stationary or portable computer, it is preferred to connect the terminal to a printer 305 to allow received information support to be printed out. If the people intending to perform the activities (e.g., mounting, dismounting and/or servicing) do not have the opportunity or ability to print out the support information, a dealer of the product can print out the support information in order to provide the information support to, for instance, the support personnel. In order to be able to request and present the received information support, presentation and inputting means 307, 309, such as a monitor, keyboard and a mouse, can be arranged at the terminal.

An example of how the present invention can be used to provide information support is presented in FIGS. 4A–4D. FIGS. 4A–4D represent an example of using the information support system according to the present invention to obtain information regarding mounting a bearing having the code 1380 EKTN9. The arrows in FIGS. 4A–4D identify the sequence of displays presented on the presentation means (e.g., display).

Figure 4A:
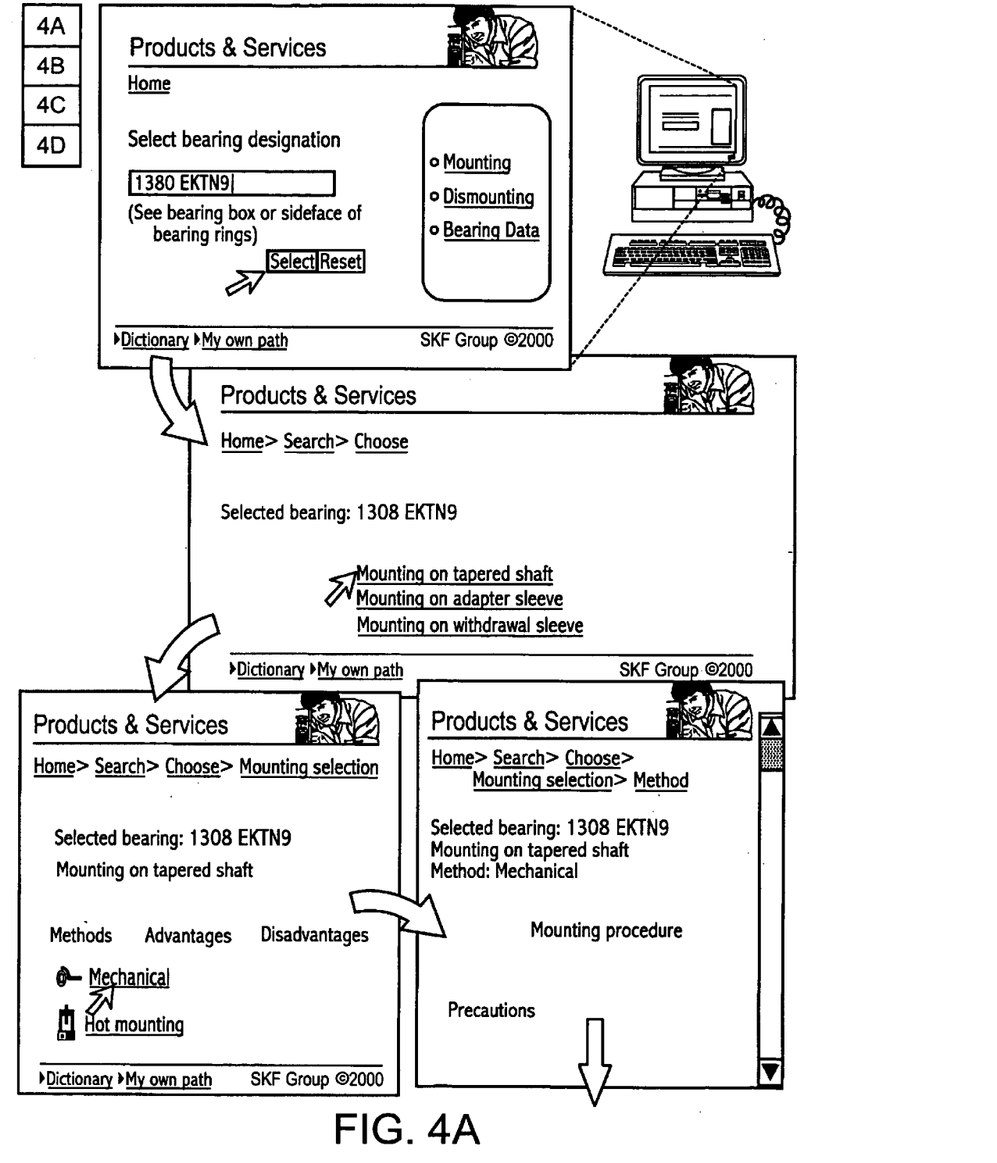
FIGS. 4A–4D show an example of information that the information support computer is arranged to provide to an information terminal in the case of mounting a specific bearing using a specific method.

The user of the information support system 1, more specifically the user at the information terminal 5, accesses the appropriate site (e.g., a website) and inputs the code 1380 EKTN9 as shown in the uppermost screen in FIG. 4A in order to initiate the assembly or gathering of support information about a product. This code can be obtained from the product, the box or other packaging in which the product is contained or other suitable packaging materials associated with the product. The second screen in FIG. 4A shows the status of the presentation means 309 (e.g., display) after the user has input the code for the particular bearing. As can be seen, the information support computer 3 responds by asking for further information. For this specific bearing, there are three alternatives available for mounting the bearing, namely mounting the bearing on a tapered shaft, mounting the bearing on an adapter sleeve or mounting the bearing on a withdrawal sleeve. The user then selects the appropriate mounting application. In this particular case, the user is interested in support information regarding mounting the bearing on a tapered shaft and so the user selects "mounting on tapered shaft". This information is transmitted to the information support computer 3 which responds as shown in the third display in FIG. 4A by asking which of several mounting procedures is of particular interest. In this case, two options are available for mounting the bearing, either mechanical mounting or hot mounting. In this example, the user selects the "mechanical" mounting procedure.

Figure 4B:
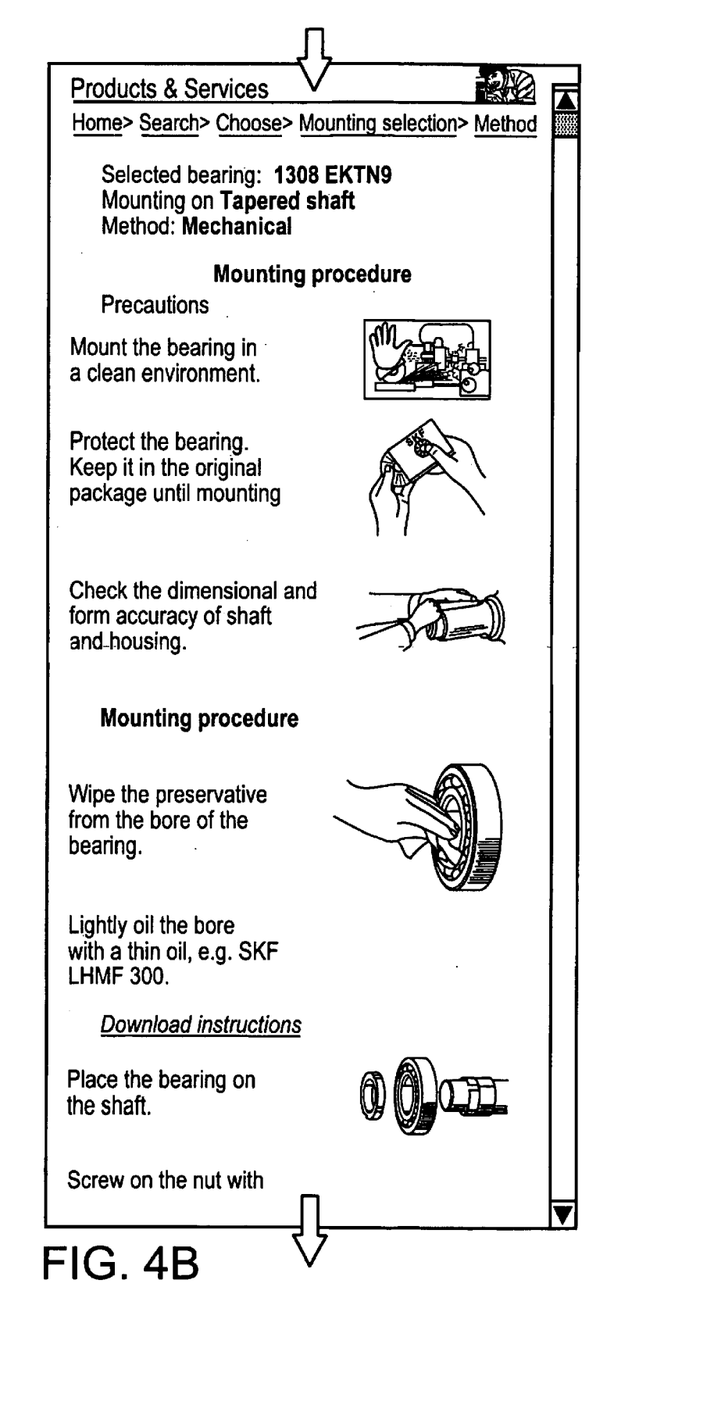
Figure 4C:
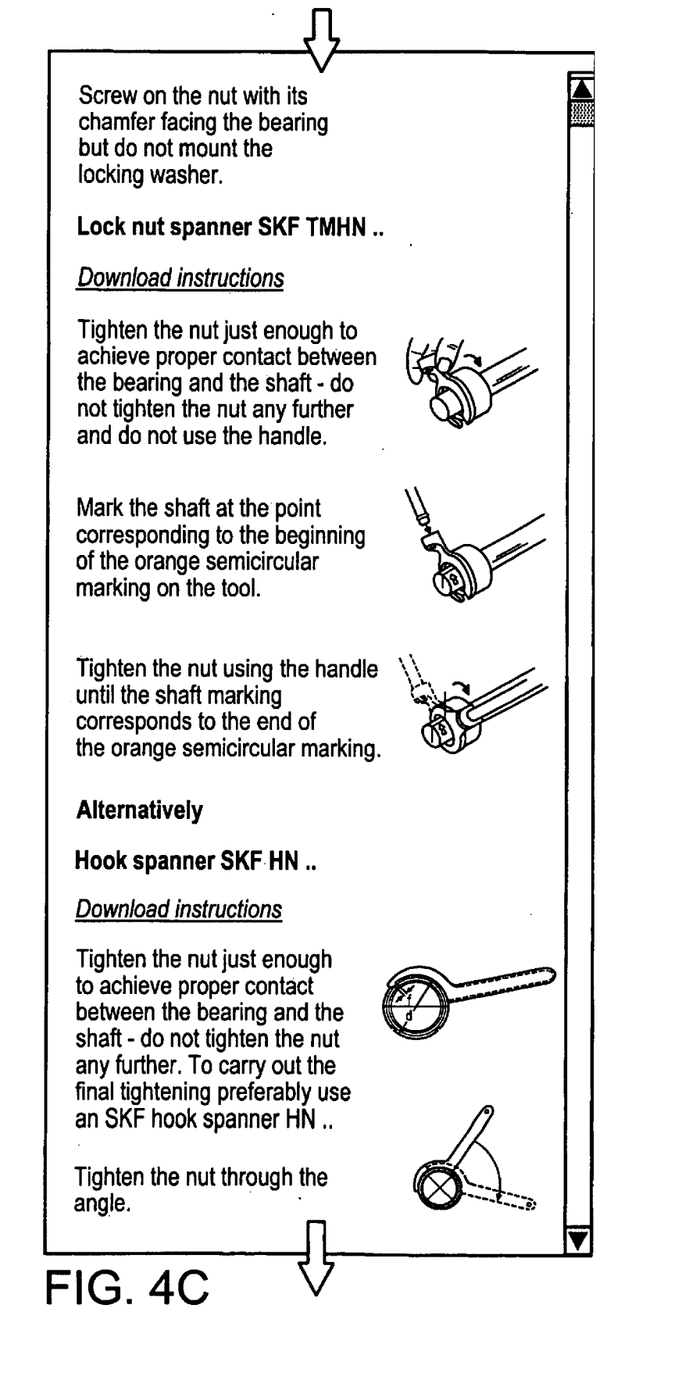
Figure 4D:
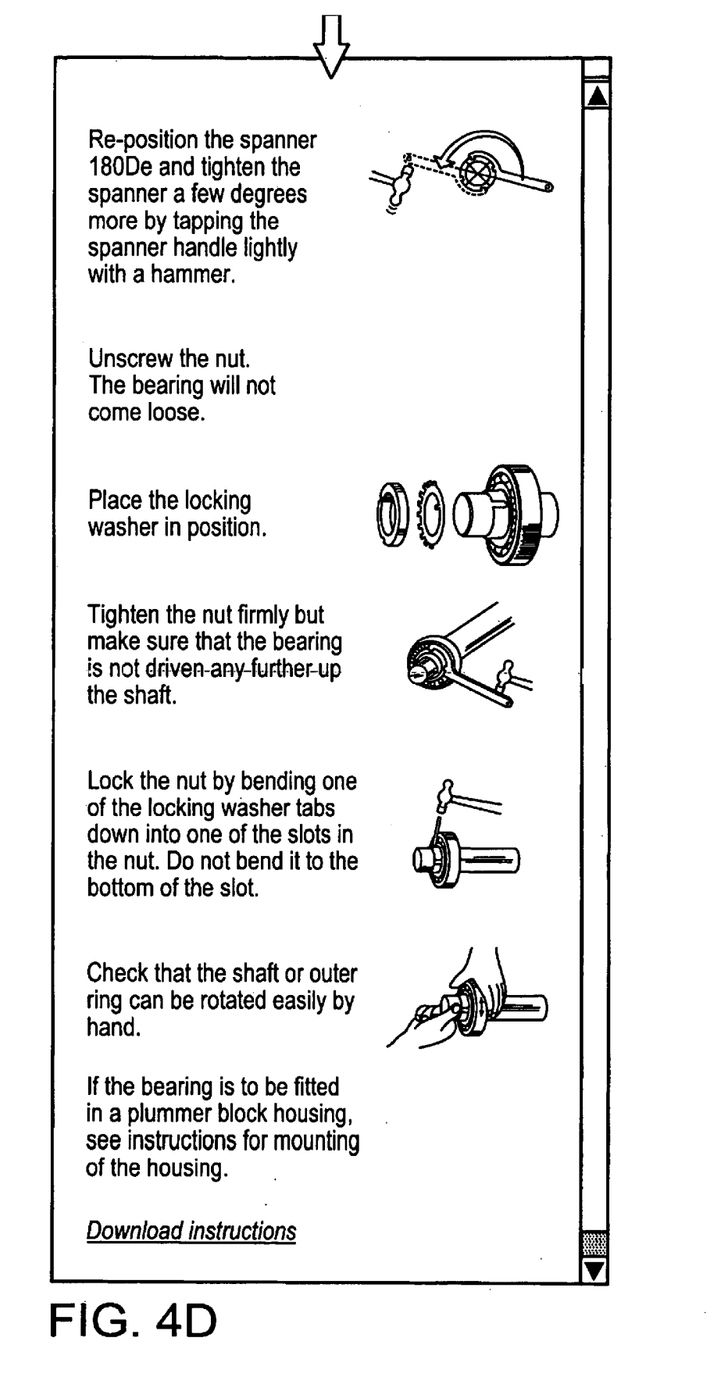

After this information is transmitted to the information support computer 3, the information support computer 3 responds, as shown in the fourth and final screen or display of FIG. 4A, and which continues in FIGS. 4B–4D, by transmitting the necessary support information regarding the mounting procedure for mechanically mounting the particular bearing on a tapered shaft (i.e., the activity procedure information). The transmitted information can also include, as noted above, information such as precautions that should be taken or that personnel should be aware of when performing the mounting procedure (e.g., the need for a clean environment), and information regarding recommended tools to be used when performing the mounting procedure. It is to be noted that in the transmitted information from the information support 3 it is possible for a user to download further information concerning specific procedures and tools.

Based on the description set forth above and the illustrations in the drawing figures, it can be seen that the present invention also provides a graphical user interface for selecting information, such as service information, associated with a bearing and/or a seal, wherein the graphical user interface includes a first interface element for entering a code associated with the bearing and/or seal, and a second interface element for selecting one of a plurality of types of procedures for which the information is to be provided.

The second interface element can include a link for each of several types of procedures. In the context of a bearing, the links for different procedures includes a first link for providing service information associated with mounting the bearing, a second link for providing service information associated with dismounting the bearing, and a third link for providing other service information associated with the bearing.

A third interface element can also be provided for selecting a combination of the code and a selected one of the service procedures. The third interface element can be designed so that user actuation of the third interface element results in a set of additional interface elements being displayed, with the additional interface elements each being associated with subfeatures of the selected one of the plurality of types of service procedures.

When the selected type of service procedure involves mounting a bearing, the subfeatures associated with the additional interface elements include a first link for providing service information associated with mounting the bearing on a first member, a second link for providing service information associated with mounting the bearing on a second member different from the first member, and a third link for providing service information associated with mounting the bearing on a third member different from the first and second members. The user actuation of the first, second and/or third links results in a display of service information associated with a corresponding mounting technique for the bearing. The display of service information can include graphics which illustrate how to perform the corresponding mounting technique.

Even though the embodiment described above has been set forth in the context of mounting a bearing, the present invention is also applicable to an information support system having an information support computer for providing support information, an information terminal for obtaining support information, a support information communication system for transferring requests for and information support, a computer program product, and methods for providing and obtaining information support, where the information support is to support personnel performing at least one of the activities of servicing, mounting and/or dismounting a bearing or a seal.

The present invention thus provides an information support system, an information support computer and an information support terminal that makes it possible to relatively quickly and easily obtain support information specifically related to an activity to be performed with respect to a bearing or seal. Through use of the product code or other information specifically associated with a particular product, support information specifically associated with that product can be obtained without the need for consulting a written catalog of information related to a wide variety of products and culling through the vast amounts of information related to the many products in order to obtain support information specifically relevant to a particular activity involving a particular product.

The principles, preferred embodiment and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A support information communication system for transferring requests for information support regarding at least one of a plurality of activities including mounting, dismounting and servicing a bearing or seal, and for transferring the information support, comprising an information terminal and an information support computer, the information support computer being adapted to:

receive an information support request via a communication network from an information terminal, the request being related to detailed support information for performing one of the activities;

process the information support request and provide support information in relation to the request; and transmit the support information via the communication network to the information terminal;

the information terminal being adapted to receive information support from the information support computer via the communication network after transmitting an information support request from the information terminal.

2. The communication system according to claim 1, wherein the information terminal and the information support computer are remotely arranged in relation to each other.

3. The communication system according to claim 1, wherein a selection of available alternatives for at least one of the activities is transmitted from the information terminal to the information support computer.

4. An information support computer for providing support information relating to at least one of a plurality of activities including mounting, dismounting and servicing a bearing or seal, the information support computer comprising:

a processor which receives an information support request via a communication network from an information terminal, the request being related to detailed support information for performing one of the activities, which processes the information support request and provides support information in relation to the request, and which transmits support information via the communication network to the information terminal.

5. The information support computer according to claim 4, wherein the support information is provided in a single information support transmission in response to a request comprising a set of data relating to the information.

6. The information support computer according to claim 4, wherein the support information is provided sequentially and transmitted in several information support transmissions to an information terminal.

7. The information support computer according to claim 4, wherein the transmitted support information presents opportunities of requesting further information support.

8. The information support computer according to claim 4, in which the support information comprises the following three categories of information:
precautions, activity procedures and recommended tools.

9. The information support computer according to claim 8, which offers personnel an opportunity to purchase recommended tools.

10. The information support computer according to claim 8, in which the support information offers information support in relation to alternatives of the at least one activity.

11. The information support computer according to claim 4, wherein the information support computer receives a code from the information terminal that is specifically related to the at least one activity.

12. The information support computer according to claim 4, in which a format of the transmitted support information is in hypertext mark-up language (HTML).

13. The information support computer according to claim 4, which allows users to choose a language for the support information from a predetermined set of languages.

14. The information support computer according to claim 4, in which the information support is in the form of text.

15. The information support computer according to claim 4, wherein the information support is in the form of images.

16. An information terminal for obtaining support information for performing at least one of a plurality of activities that include servicing, mounting and dismounting a bearing or a seal, the information terminal comprising:
a processor which receives information support from an information support computer via a communication network after transmitting an information support request, related to at least one of the plurality of activities, from the information terminal to allow the at least one activity to be performed.

17. The information terminal according to claim 16, wherein the information terminal is one of a stationary computer, a portable computer, a hand-held computer, and a mobile phone.

18. The information terminal according to claim 16, including a printer operatively associated with the information terminal.

19. The information terminal according to claim 16, wherein the terminal transmits a selection of available alternatives for performing at least one of the plurality of activities.

20. A method for providing information support specifically related to performing an activity comprising:
receiving an information support request at an information support computer from an information terminal via a communication network regarding at least one of a plurality of activities that include mounting, dismounting and servicing a bearing or a seal;
processing the information support request to provide support information regarding the at least one activity; and
transmitting the support information via the communication network to the information terminal.

21. The method according to claim 20, including transmitting the support information in a single information support transmission in response to the request comprising a set of data relating to the information requested.

22. The method according to claim 20, including providing and transmitting the support information in several information support transmissions, of which each one is the response of a request from an information terminal.

23. The method according to claim 20, further comprising receiving a code from the information terminal, and the information support computer transmitting support information relevant to an activity specifically related to the code.

24. The method according to claim 20, further comprising formatting the information support prior to transmission to the hypertext mark-up language (HTML).

25. The method according to claim 20, further comprising choosing a language of the information support from a predetermined set of languages in the information support computer.

26. The method according to claim 20, wherein the support information is provided at least partially as text.

27. The method according to claim 20, wherein the support information is provided at least partially as images.

28. The method according to claim 20, further comprising:
providing available alternatives for performing at least one of the plurality of activities.

29. A method for obtaining information support to be used by personnel to perform at least one of a plurality of activities that include servicing, mounting and dismounting a bearing or a seal, comprising:
transmitting to an information support computer via a communication network an information support request relating to a bearing or seal using an information terminal; and
receiving detailed information support at the information terminal from the information support computer via the communication network regarding the at least one activity involving the bearing or seal.

30. The method according to claim 29, further comprising:
displaying available alternatives for performing the at least one of the plurality of activities.

31. A graphical user interface for selective provision of service information associated with at least one of a bearing and a seal, said graphical user interface comprising:
a first interface element for entering a code associated with said at least one of a bearing and a seal; and
a second interface element for selecting one of a plurality of types of service procedures for which said service information is to be provided.

32. The graphical user interface of claim 31, wherein said at least one of a bearing and a seal is a bearing, and said second interface element includes a link for each of a plurality of types of procedures including at least one of:
a first link for providing service information associated with mounting said bearing;
a second link for providing service information associated with dismounting said bearing; and
a third link for providing other service information associated with said bearing.

33. The graphical user interface of claim 31, further comprising a third interface element for selecting a combination of said code and a selected one of said plurality of types of service procedures.

34. The graphical user interface of claim 33, wherein user actuation of said third interface element results in a set of additional interface elements being displayed, which additional interface elements are each associated with subfeatures of said selected one of said plurality of types of service procedures.

35. The graphical user interface of claim 31, wherein said at least one of a bearing and a seal is a bearing, said selected one of said plurality of types of service procedures is mounting said bearing and said subfeatures associated with said additional interface elements include:
- a first link for providing service information associated with mounting said bearing on a first member;
- a second link for providing service information associated with mounting said bearing on a second member different from said first member; and
- a third link for providing service information associated with mounting said bearing on a third member different from said first and second members.

36. The graphical user interface of claim 35, wherein user actuation of one of said first, second and third links results in a display of service information associated with a corresponding mounting technique for said bearing.

37. The graphical user interface of claim 36, wherein said display of service information includes graphics which illustrate how to perform said corresponding mounting technique.

* * * * *

UNITED STATES PATENT AND TRADEMARK OFFICE
CERTIFICATE OF CORRECTION

| | |
|---|---|
| PATENT NO. | : 7,088,378 B1 |
| APPLICATION NO. | : 09/718385 |
| DATED | : August 8, 2006 |
| INVENTOR(S) | : Bengt Engström et al. |

It is certified that error appears in the above-identified patent and that said Letters Patent is hereby corrected as shown below:

On Title Page,
At (73) Assignee, change "Gothenburg" to --Göteborg--.

Signed and Sealed this

Nineteenth Day of December, 2006

JON W. DUDAS
*Director of the United States Patent and Trademark Office*